Jan. 11, 1938.   D. L. BRUNER   2,105,137
RETRACTABLE LANDING LIGHT
Filed Nov. 12, 1934   2 Sheets-Sheet 1
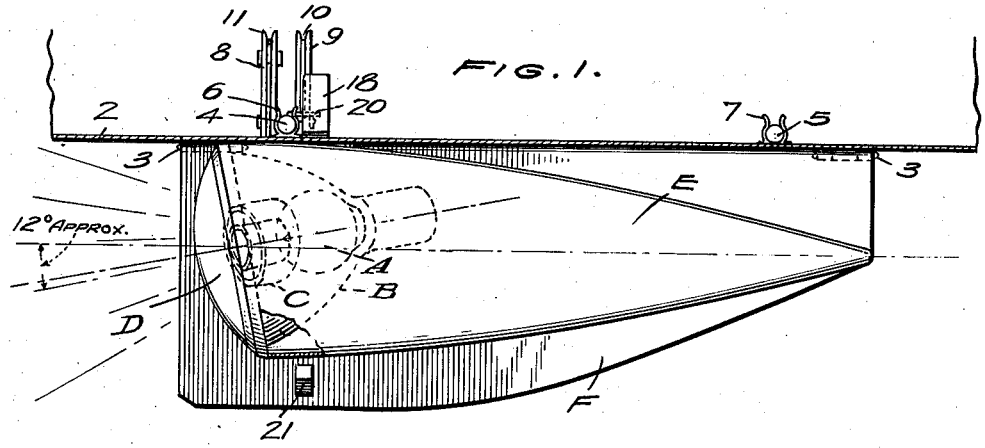
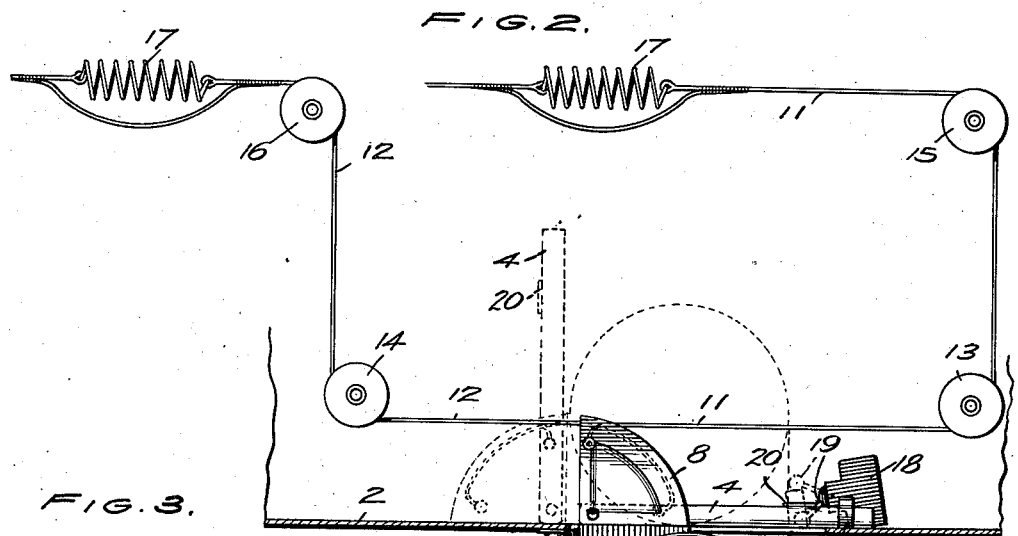
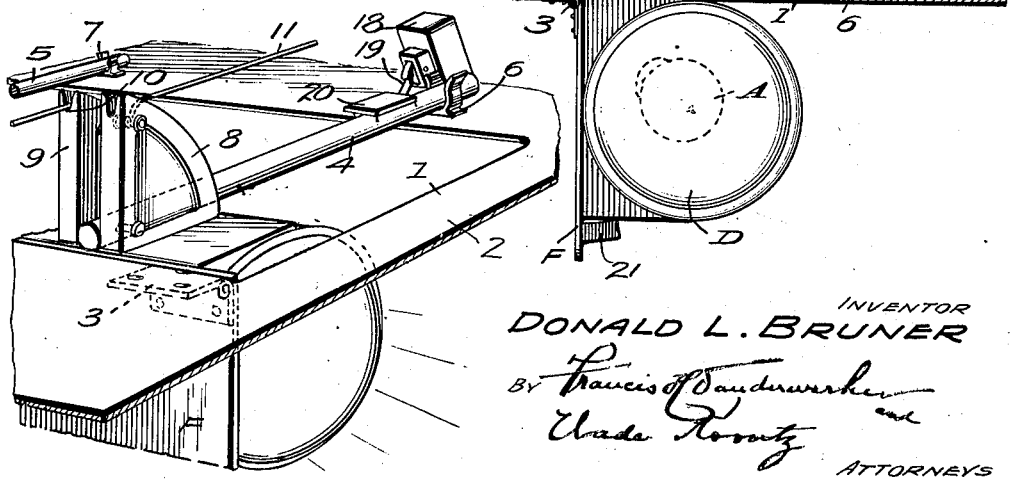
INVENTOR
DONALD L. BRUNER
BY
ATTORNEYS Jan. 11, 1938.　　　　D. L. BRUNER　　　　2,105,137
RETRACTABLE LANDING LIGHT
Filed Nov. 12, 1934　　　2 Sheets-Sheet 2
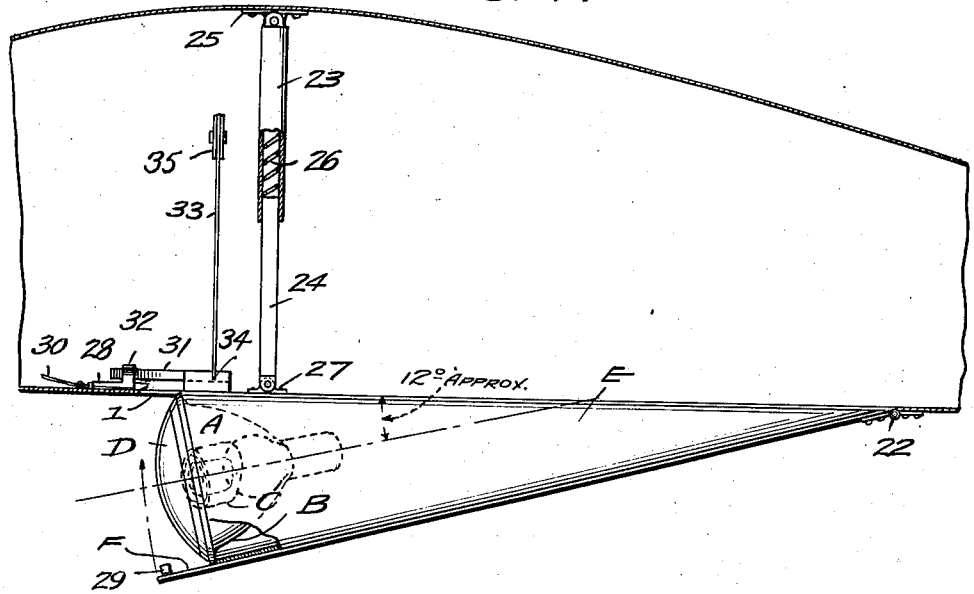
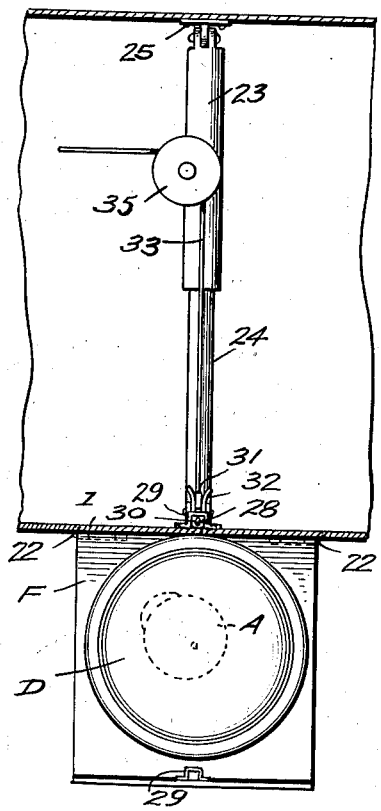
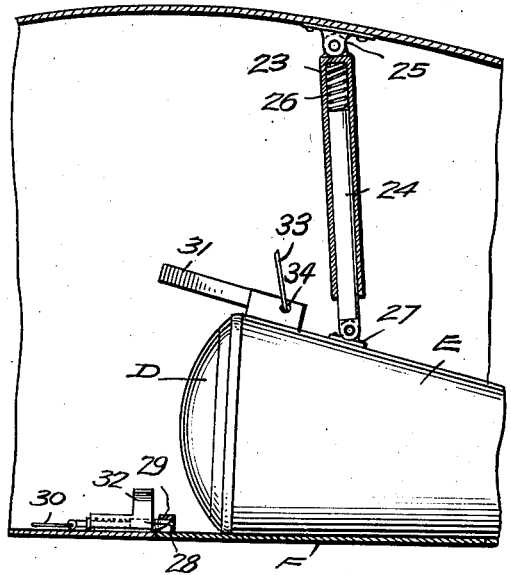
INVENTOR
DONALD L. BRUNER
ATTORNEYS Patented Jan. 11, 1938

2,105,137

UNITED STATES PATENT OFFICE 2,105,137

RETRACTABLE LANDING LIGHT

Donald L. Bruner, Coral Gables, Fla.

Application November 12, 1934, Serial No. 752,763

2 Claims. (Cl. 240—7.7)

This invention relates to retractable airplane landing lights.

The retractable airplane landing light has been, for many years, unattractive from practically all standpoints save that of low head resistance. Commercial lights have been cumbersome, requiring heavy controls, and have been quite unsatisfactory from a pilot's viewpoint especially when considered for emergency use: the conventional type requiring considerable effort on the part of the pilot to make them ready for use and a separate operation for turning them on. There has been no assurance that when the light was cranked out it was in the proper position for use as a landing light.

It is an object, therefore, of the present invention to provide a retractable airplane landing light assembly of such novel and efficient structure and design as to be operable without the disadvantages mentioned and which, at the same time, can be installed and maintained in an airplane wing at minimum expense.

To this end, it is a further object of the invention to provide a retractable airplane landing light of a simple construction which combines the two operations of pulling out the light and turning it on into one operation and also insures that the light is in its exactly proper position for use and is in proper focus with but a single operation required on the part of the pilot.

The objects and advantages of the invention will be more apparent from the following detailed description of two specific embodiments of the invention and the accompanying drawings illustrating the same and wherein:—

Figure 1 is a side view of a retractable landing light assembly constructed and installed in an airplane wing according to one form of the invention, with the light shown in lowered position.

Figure 2 is a front view of the retractable landing light assembly, the position of the assembly when retracted being indicated in dotted lines.

Figure 3 is a perspective view in which the light switch and switch operating mechanism is clearly displayed.

Figure 4 is a view in cross section of an airplane wing showing another form of retractable landing light embodying the invention and a different type of installation; the light being shown in lowered position.

Figure 5 is an end view of the landing light assembly shown in Figure 4, and,

Figure 6 is a side view of the same assembly as shown in Figures 4 and 5 but with the landing light in its raised or retracted position.

Briefly, the invention consists of a lamp A, offset reflector B, louver C to cut off stray light, and a glass cover or lens D, (such as disclosed in my Patent No. 1,966,436 issued July 18, 1934) mounted in a streamlined shell E on a plate F which in the retracted position of the landing light assembly becomes a part of the lower wing surface. The assembly is pulled out to landing position or returned to the retracted position by a system of cables and pulleys. The operation of pulling the assembly out to the landing position also closes the lamp circuit. The light beam is projected outward from the line of flight by use of the offset reflector and the correct downward elevation is obtained by design of the streamline shell. The plate is hinged either at the side or at the rear end.

In the installation shown in Figures 1 to 3 inclusive, an opening 1 is provided in the underside 2 of the wing to receive the plate F, the latter in its retracted position coinciding with the bottom surface of the wing with the streamline shell E and its enclosed elements disposed inwardly of the wing, as indicated in dotted lines in Figure 2. The plate swings downwardly to vertical position about hinges 3 connecting one side of the plate to the wing structure and, in order that it will come to a postiive stop into the correct location for the light, laterally spaced stop rods 4 and 5 are fixed rigidly to the plate and shell adjacent the hinged side of the plate and extending at right angle to the plate in the manner shown. The stop rods extend vertically within the wing structure in the retracted position of the plate and move downward with the latter until disposed horizontally across the wing opening 1 and engaged at their outer ends by the spring clamps 6 and 7 respectively located adjacent the far side of the opening and inwardly of the wing. By means of this arrangement, the landing light, when rotated downwardly, falls into the correct position without further adjustment.

Suitable means for lowering and raising the lamp assembly include a pair of quadrants 8 and 9 fixed rigidly to the plate F and shell E, inwardly of the hinged side and with their respective arcuate edges concentric to the axis of the plate. Each quadrant has a cable guide or groove in its arcuate edge as shown at 10. A lowering cable 11 is connected to quadrant 8 and a raising cable 12 to quadrant 9, the point of connection between quadrant 8 and cable 11 being at the extremity of the cable groove to the left of the axis in Figure 2 and the point of connection between cable 12 and quadrant 9 being at the extremity of the cable groove to the right of the axis, the cables extending in relatively opposite directions to and around pulleys 13 and 14, thence upwardly and over pulleys 15 and 16 from whence they proceed in the same direction to a point within convenient reach of the pilot. Each cable is provided with an elastic insert, such as a spring 17. When the assembly is in its retracted or dotted line position, a pull on cable 11 will cause the quadrants to rotate in a clockwise direction and the plate F to swing downwardly, the movement of the parts being arrested when the stop rods 4 and 5 engage the clamps 6 and 7. As will be noted in Figure 1, the shell E tapers rearwardly of its forward end to a common point at the surface of plate F and the forward end, to which the reflector B and lens D are attached, is inclined approximately 12° from the vertical to direct the light beam downwardly from the line of flight. The reflector B and lamp A are offset laterally and horizontally of the axis of the lens to project the beam outwardly of the line of flight. The design and construction of the parts are such that the lamp assembly will be properly positioned for directing the light beam at the correct angles when the downward movement of the plate is arrested by the stop rods in the manner described.

In order that the operation of pulling out the light to landing position may also result in the closing of the lamp circuit, the main line switch 18 is fixed inwardly of the wing on the far side of opening 1 and in close proximity to the clamp 6 with its snap switch arm 19 disposed in the downward path of a striker plate 20 carried by stop rod 4 and in the upward path of a striker lug 21 carried by plate F. Thus, when the lamp assembly is in its retracted position, the switch arm is in its "off" or circuit breaking position due to the thrust of the striker lug 21 and it remains in that position during the lowering of the lamp assembly until shifted over to "on", or circuit closing position, by the impact of the downwardly moving strike plate 20. This has an advantage over prior devices in that it provides for a reduction of operations from two (lowering the light and closing the circuit) to one. One operation lowers the light and closes the lamp circuit and since the plate is at all time edgewise to the air flow, the operator does not operate the device against the pressure of the slip stream.

In the modified form of the invention embodied in Figures 4 to 6 inclusive, the plate F is hinged at its rear end 22 so that as it is moved downwardly it presents the flat surface to the slip stream, the pressure of which is thus utilized in aiding the lowering operation. An elastic connection is provided between the top of the wing structure and the top of the shell E; preferably in the nature of telescopic tubes 23 and 24, the former pivotally suspended from the wing bracket 25 and containing a spring 26 which, in the retracted position of the lamp assembly, is adapted to be compressed between the top of tube 23 and adjacent inner end of tube 24. Tube 24 is pivotally connected with the shell bracket 27. The lamp assembly is normally held in its retracted position within the wing by a spring pressed latch bar 28 engaging a keeper 29 on the plate F. When the latch mechanism is released by a pull on the latch cord 30, the lamp assembly drops through the bottom opening 1 of the wing and is arrested in its downward movement only when the knife blade 31 of the lamp circuit closing switch engages the switch fingers 32. As will be noted in Figure 6, the switch knife blade is fixed rigidly to the top of the shell E and projects forwardly of the shell to provide a stop member which, when engaged with the switch fingers 32 fixed to the wing structure adjacent the opening 1, arrests the downward drop of the plate and at the same time closes the lamp circuit. The assembly is drawn upwardly to the retracted position shown in Figure 6 by means of a cable 33 attached at a suitable place 34 to the lamp assembly and passing upwardly around guide pulley 35 to convenient reach of the pilot. As is indicated in Figure 4, the beam from the lamp A is directed downwardly from the line of flight, in the lowered position of the assembly, at an angle of 12°, approximately, and it is directed outwardly from the line of flight by reason of the offset reflector B.

Although in the foregoing disclosure, the invention is described and illustrated with reference to its embodiment in two specific types of installation, one in which the light is rotated from its retracted position to a positive stop and another in which the light tilts straight down to a positive stop, it is not limited to the precise construction set forth and is subject to various changes and modifications with the scope of the appended claims. Either of the above described arrangements, however, provide an improved retractable airplane landing light satisfactory for emergency use, as but a single definite operation on the part of the pilot is required to put the light in its proper position and turn it on, and when the light is retracted its lower surface will coincide with the bottom surface of the wing so as to have zero head resistance. By reason of the location of the hinges at the side or rear of the assembly, the effect of the slipstream is either neutralized or used to aid the operation of lowering the light.

Having thus described the invention, what is claimed as new is:—

1. In a retractable landing light for an airplane, in combination, an airplane wing having a bottom opening, a flat plate mounted to swing downwardly to vertical position about hinges connecting one side of the plate to the wing structure, said plate in its upward or normally retracted position being received in the opening in the wing bottom and coinciding with the bottom surface of the wing, a lamp assembly mounted on said plate for projecting a beam of light downwardly and outwardly of the line of flight in the vertical position of the plate, stop rods fixed to said plate and movable therewith into abutment with the wing structure when the plate is in its vertical position, a lamp circuit switch fixed to the wing structure, a striker plate on one of the said stop rods to engage and move the switch to circuit closing position when the stop rods and plate are substantially at the limits of their downward travel, means for raising and lowering the said plate, and means on the plate positioned to contact with and reverse the switch when the plate is substantially in retracted position.

2. In an airplane retractable landing light, an airplane wing structure having a bottom opening, a plate normally closing said opening and hingedly mounted to swing downwardly thereof, an electric lamp assembly carried by said plate for projecting a beam of light downwardly and outwardly of the line of flight in the downwardly swing position of the plate and means for lowering and raising the said plate including a pair of quadrants fixed rigidly to the plate inwardly of the hinge with their arcuate edges concentric to the hinge axis of the plate, guide pulley fixed to the wing structure, cables connected to the said quadrants and extending in relatively opposite direction from the quadrants and around the pulleys to a point within convenient reach of a pilot of the airplane.

DONALD L. BRUNER.